(12) United States Patent
Kolesov et al.

(10) Patent No.: US 12,461,727 B2
(45) Date of Patent: Nov. 4, 2025

(54) SYSTEMS AND METHODS FOR INDEPENDENT APPLICATION DESIGN AND DEPLOYMENT TO PLATFORM HOST

(71) Applicant: CloudBlue LLC, Irvine, CA (US)

(72) Inventors: Anatolii Kolesov, Moscow (RU); Viacheslav Dubinskii, Barcelona (ES); Dmitry Nozdrin, Moscow (RU)

(73) Assignee: CloudBlue LLC, Irvine, CA (US)

( * ) Notice: Subject to any disclaimer, the term of this patent is extended or adjusted under 35 U.S.C. 154(b) by 233 days.

(21) Appl. No.: 17/824,563

(22) Filed: May 25, 2022

(65) Prior Publication Data

US 2023/0409306 A1 Dec. 21, 2023

(51) Int. Cl.
*G06F 8/60* (2018.01)
*G06F 8/61* (2018.01)

(52) U.S. Cl.
CPC . *G06F 8/60* (2013.01); *G06F 8/61* (2013.01)

(58) Field of Classification Search
CPC .................................................. G06F 8/60–66
See application file for complete search history.

(56) References Cited

U.S. PATENT DOCUMENTS

| | | | |
|---|---|---|---|
| 6,044,218 A | 3/2000 | Faustini | |
| 6,195,696 B1 | 2/2001 | Baber | |
| 6,208,345 B1 | 3/2001 | Sheard et al. | |
| 7,451,403 B1 | 11/2008 | Srinivasan | |
| 9,455,876 B1 | 9/2016 | Grebenschikov et al. | |
| 9,715,439 B1 | 7/2017 | Fewtrell | |
| 10,237,370 B2 * | 3/2019 | Braudes | G06F 8/61 |
| 10,452,372 B2 | 10/2019 | Lundberg | |
| 10,552,852 B1 | 2/2020 | Shirley et al. | |
| 10,749,856 B2 * | 8/2020 | Kostyukov | G06F 9/44526 |
| 10,942,719 B2 * | 3/2021 | Dubinskii | G06F 8/41 |
| 11,256,484 B2 | 2/2022 | Nikumb | |
| 11,397,569 B2 | 7/2022 | Mhar | |
| 2007/0061724 A1 | 3/2007 | Slothouber | |
| 2007/0168658 A1 | 7/2007 | Yamauchi | |
| 2010/0070886 A1 | 3/2010 | Poulsen | |
| 2012/0198029 A1 | 8/2012 | Madanes | |
| 2017/0094024 A1 * | 3/2017 | Braudes | G06F 8/61 |
| 2017/0249448 A1 | 8/2017 | Beckman et al. | |

(Continued)

OTHER PUBLICATIONS

Search Report and Written Opinion, dated Oct. 11, 2023, issued in PCT/US2023/067451.

(Continued)

*Primary Examiner* — Todd Aguilera
(74) *Attorney, Agent, or Firm* — Ice Miller LLP

(57) ABSTRACT

Systems and methods for creating, sharing, and integrating a vendor application are provided. A method for application development and deployment comprises communicating, by a host platform, a framework package corresponding to an application framework, wherein the framework package comprises a software abstraction for providing generic functionality in developing a vendor application, receiving, by the host platform, an application package corresponding to a vendor application, wherein the application package comprises a plurality of metadata files, control method descriptions, and content files, and integrating the application package to generate an integration of the vendor application based on the application framework.

14 Claims, 7 Drawing Sheets

(56) References Cited

U.S. PATENT DOCUMENTS

| | | |
|---|---|---|
| 2017/0329588 A1 | 11/2017 | Lundberg |
| 2018/0089132 A1 | 3/2018 | Atta et al. |
| 2018/0113680 A1 | 4/2018 | Browning |
| 2018/0167378 A1* | 6/2018 | Kostyukov ......... H04L 63/0815 |
| 2018/0203674 A1 | 7/2018 | Dayanandan |
| 2019/0235993 A1 | 8/2019 | Modeel |
| 2019/0354354 A1* | 11/2019 | Dubinskii ........... G06F 11/3466 |
| 2021/0342147 A1 | 11/2021 | Singh |
| 2021/0397418 A1 | 12/2021 | Nikumb |
| 2022/0070279 A1 | 3/2022 | Pang et al. |
| 2022/0131852 A1 | 4/2022 | Sharma et al. |
| 2022/0197620 A1 | 6/2022 | Vihar |
| 2022/0357977 A1 | 11/2022 | Kalou |
| 2023/0385027 A1* | 11/2023 | Kolesov .................... G06F 8/20 |
| 2023/0385038 A1* | 11/2023 | Kolesov ............. G06F 9/45508 |

OTHER PUBLICATIONS

Vachhar, V., "Structuring Your StoryBook," StoryBook [online], Feb. 2022 [retrieved Oct. 16, 2024], Retrieved from Internet: <URL https://storybook.js.org/blog/structuring-your-storybook/>, whole document.

* cited by examiner

SYSTEMS AND METHODS FOR INDEPENDENT APPLICATION DESIGN AND DEPLOYMENT TO PLATFORM HOST

TECHNICAL FIELD

This invention relates to a method and a standard for application packaging and integration, and, more particularly, to application resource integration and deployment into a cloud.

BACKGROUND

Computer systems present some challenges with regard to developing and installing updates and patches to hosted web applications. Software as Service (SaaS) web applications are integrated into systems by a vendor using special delivery and installation packages. However, if the vendor needs to integrate/deploy his application into a cloud, he will have to repeat all integration operations for each host or hosting platform several times. The hosts and the hosting platforms have applications that control the host or the hosting platforms. These applications make it very difficult and expensive to integrate external (third party) applications or web services.

Currently, integration of applications into hosts and hosting platforms is implemented by a controller. In case of a cloud system. A cloud (or cloud server) is a software-hardware combination of a host provider, which provides for functionality of external applications in its client's accounts.

In the field of cloud computing platforms, there exists an inefficiency of creation and deployment of client applications in conjunction with platform form operations. For example, cloud computing platforms may encounter problems related to effective application development and/or host deployment. Software as Service (SaaS) web applications are generally developed in a rigid association with a platform host. All processes relating to new applications in development are rigidly tied to platform host stacks deployment. Such method brought inconveniences and time losses in common with background related to necessity to resolve problems with applications on a core level.

The main disadvantage of conventional technologies is that, during a new application creation and deployment, a platform host is required to communicate packages having indefinite testing environment inside a package during application development. Moreover, the conventional technologies require excess deployment time, and a continuous internet connection is required during application creation. Accordingly, there is a need in the art for an efficient and inexpensive method for integration of the application itself, application updates and patches into a cloud platform host.

BRIEF SUMMARY OF THE INVENTION

Embodiments described herein provide for independent application design and deployment to a platform host.

According to embodiments of the present invention, Systems and Methods for Independent Application Design and Deployment to Platform Host (IADD) are provided to improve application development process. The IADD solution effectively addresses the above-mentioned technical problems, providing an independent application creation process and efficient application deployment to a platform host minimizing downtime, on a platform host core level.

IADD systems and methods are provided for creating, sharing, and integrating a vendor application. Systems and methods for application development and deployment can include communicating, by a host platform, a framework package corresponding to an application framework, wherein the framework package comprises a software abstraction for providing generic functionality in developing a vendor application, receiving, by the host platform, an application package corresponding to a vendor application, wherein the application package comprises a plurality of metadata files, control method descriptions, and content files, and integrating the application package to generate an integration of the vendor application based on the application framework.

According to some embodiments, IADD systems and methods differ from previous prior art technologies in that the rigid connection application-host is broken at the time of application development. The host "adopts" already workable application that is easily deployed there. Even constant internet connection when application developing is not required for such scenario. Conventional systems and methods can require several hours merely to begin a process of developing new application, due to host operations. According to exemplary embodiments, a platform host is separated from application development process which brought many efforts. A new application can be created and tested before host deployment to enable production of reliable applications when deployed. Moreover, the necessity of fixing faults due to a host core level is omitted during application development, resolving an additional problem in conventional technologies. IADD systems and methods enable efficient application creation with respect to speed, reliability, resource savings.

BRIEF DESCRIPTION OF THE DRAWINGS/FIGURES

DETAILED DESCRIPTION OF THE INVENTION

Figure 1:
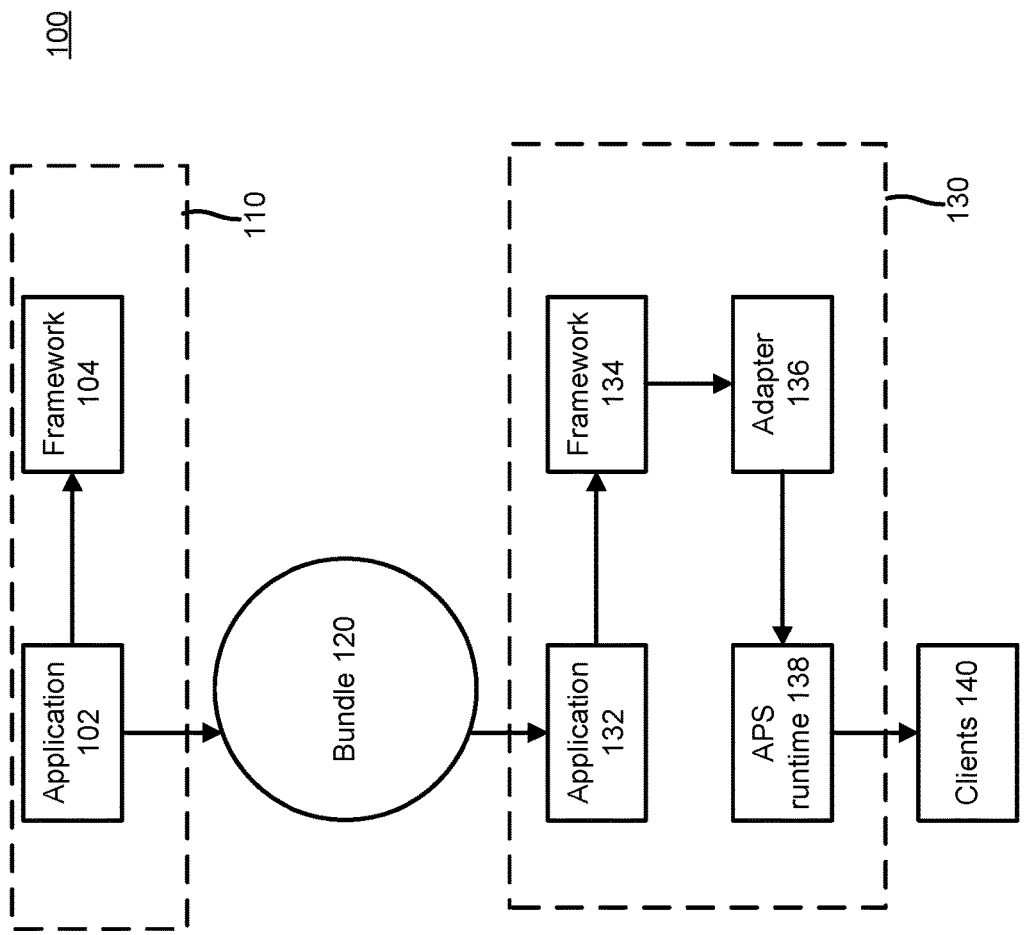
FIG. 1 depicts an example operating environment of a system for independent application design and deployment to a platform host, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Application Creation

IADD systems and methods are provided to address the above-mentioned technical problems. IADD systems and methods provide a specific layer for a vendor application that is local and independent from a platform host. This permits application development even having a non-persistent internet connection mode.

FIG. 1 illustrates an IADD system, according to some embodiments. As shown in FIG. 1, IADD systems 100 provides an ecosystem for several projects that can be separated based on, for example, functionality, responsibility and teams. IADD system 100 comprises development platform 110, bundle 120, and platform host (hosting cloud) 130.

As depicted, application creation at development platform 110 is separated of the platform host 130 itself. According to the exemplary embodiment, one or more frameworks associate an application of development platform 110 to a (production) application of platform host (130). That is, the framework(s) mutually connect the respective applications. The framework(s) comprise fundamental templates needed for application and testing at development platform 110. The framework(s) also comprise necessary specific means to integrate and deploy an application at a platform host (hosting cloud) 130.

In the exemplary embodiment, development platform 110 comprises application 102 and framework 104. Application 102 can include developer-written code. Framework 104 (e.g, VUE) can provide a software abstraction for providing generic functionality, that can be selectively adapted and implemented by application 102, thus providing application-specific software, such as for building user interfaces. Framework 104 can provide this abstraction built on top of standard programming languages (e.g., HTML, CSS, JavaScript, etc.), providing a declarative and component-based programming model permitting efficient development of application-specific software, such as a user interface, whether simple or complex.

When IADD 100 is configured to deploy application 102, development platform 110 can generate an application bundle 120 that implements application 102 and framework 104 as a stand-alone, all in one container. According to the exemplary embodiment, a developer (e.g., a cloud application vendor or the like) can bundle application 102 and framework 104 according to the APS. The format of the bundle depends on the receiver, such as platform host 130. If the receiver is a standard WINDOWS desktop, then the software can be packaged using standard installers, and the file has a *.exe or *.msi extension. The installer includes unpacking rules, that includes a user dialog, writing into the registry, checking for updates, and so on. In the case of APS, the bundle can have a app.zip extension, and includes metadata, scripts and software code itself.

Exemplary development application 102 is transferred via application bundle 120 to platform host 130. An application 132 is generated inside the platform host 130. Platform host 130 comprises applications 132 and framework 134, adapter 136 and Application Packaging Standard (APS) module 138.

Adapter 136 connects framework 104/134 to the platform host at runtime, rendering interpret application 132 and framework 134 as a web application that provides an interface to a client via APS module 138.

APS module 138, also referred to as a controller or an application packaging controller, is a runtime module configured to distribute applications 132 to clients 140. One application can be delivered to one client or to multiple clients, as shown in FIG. 1. The APS is a specification defining a life cycle of application 132 in a cloud. The application's life cycle includes packaging, delivering to the cloud, integrating (and unpacking/deploying) into the cloud, distributing to clients, licensing, functionality, updates and deletion. The APS can include an Application Programming Interface (API) for accessing the APS functions from a program code or by http/https requests. The APS provides for efficient integration of SaaS web applications, such as application 132, into the cloud. According to the exemplary embodiment, in order for an application to function according to the APS, an APS module 138 (i.e., a controller) is integrated into a software hosting platform of a hosting cloud (platform host 140).

APS module 138 functions as a connector for controlling application(s) 132. APS module 138 receives application control requests and APS module 138 distributes the requests to appropriate scripts of application APS package 120. Application(s) 132 responses to clients 140 (outside of the cloud 100) are also processed by the controller module 110 and provided to clients 125. To integrate an application, APS module 138 applies framework 134 and can perform a validation of each of a format and structure of the application package (e.g., bundle 120), metadata of the metadata files, and at least one application programming interface (API) function of the vendor application.

Figure 2:
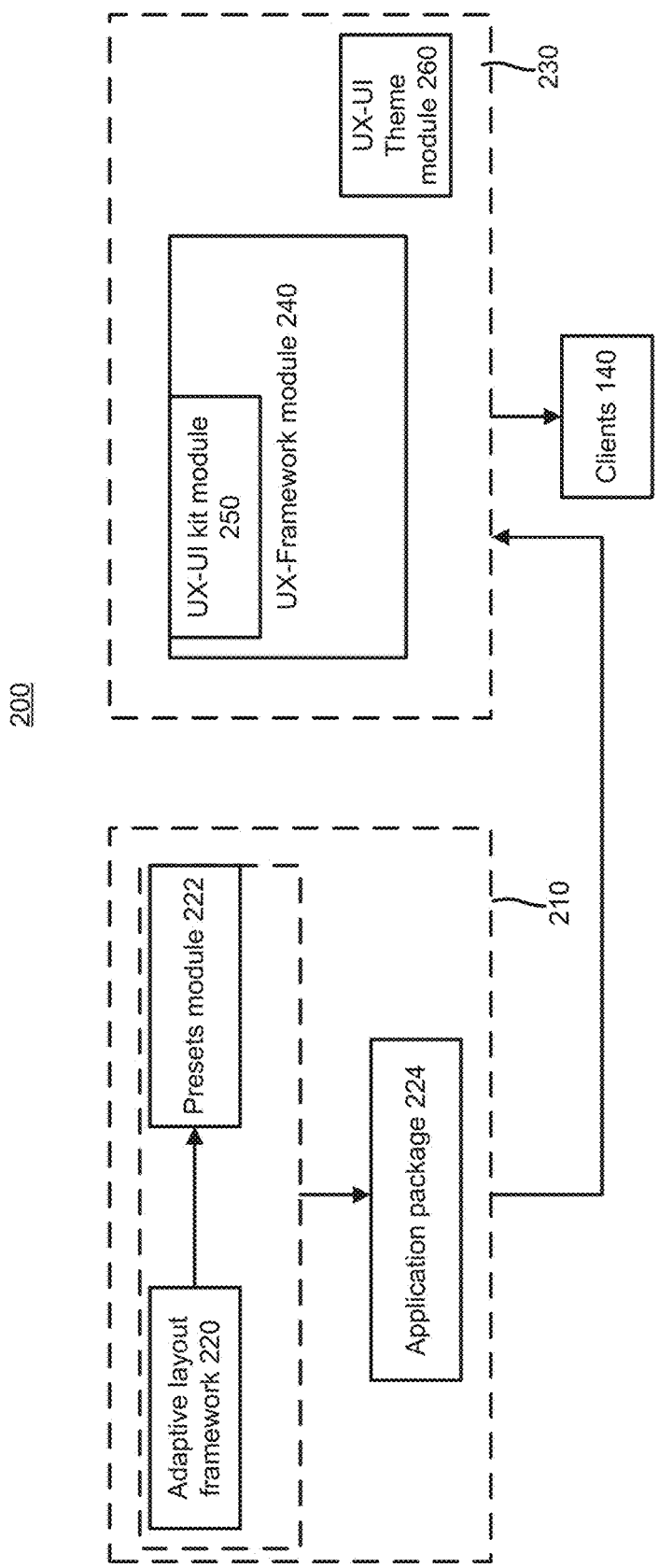
FIG. 2 depicts a system for independent application design and deployment to platform host, according to some embodiments.

FIG. 2 illustrates communication of the application with the platform host. As shown in FIG. 2, system 200 comprises local development application 210 and platform host 230. Local development application 210 comprises adaptive layout framework 220 (skeleton) and presets module 222, which can include fast development system presets. A preset can include, for example, one or more plugins, with some optional configuration. For example, a preset can contain plugins/options bundled together with other configuration options so that selecting a preset would mean selecting all those options.

For example, a default preset can include plugins (e.g., Babel, Typescript, Vuex, ESLint, Unit-Jest, etc.) as options/features. If a developer selects the default preset, local development application 210 can be created and install utility modules during project creation. Additionally or alternatively, a developer can also manually select desired options and plugins. A preset enables faster project creation. Presets module 222 operates in communication with adaptive layout framework 220 (skeleton).

As described above, the environment is prepared with the framework as a supplementary layer. The framework comprises everything required for a new application in isolation from the production stack, which can also be used for testing. As described in more detail below, an application can be compiled to a bundle file to be dynamically communicated to a platform host, enabling communication and implementation to a platform host to be optimized. The bundle file can be prepared as a set of asynchronous web components which can be communicated part-by-part upon opening a new page-representation of the application.

According to some embodiments, platform host 230 can comprise a user experience (UX) framework module 240, UX-user interface (UX-UI) kit module 250, and UX-UI theme module 260. UX framework module 240 comprises runtime components for operating in runtime, for local development and for testing. For example, platform host 230 can be an embodiment of platform host 130. In some embodiments, platform host 230 can include UX-UI kit module 250 that comprises means for creating ready form via mockups using a set of components (UI blocks), as a private part integrated into UX framework module 240. UX-UI theme module 260 provides a repository that comprises design tokens, global styles and override styles, i.e., elements representing design decisions and values.

Unlike conventional deployment processes, a hot module replacement (HMR) process can be performed to permit development of application 210 utilizing an environment of framework (e.g., corresponding to UX framework 240). Therefore, a developer can assess changes in application 210 without causing the application to be deployed at platform host 230.

Platform host 230 may receive a first indicator from IADD system 200. According to some embodiments, platform host 230 can be triggered, for example, in response to a prompt by IADD system 200, a request from a local development platform, a scheduled event, or the like, to request a status of local development application 210.

In response to receiving the first indicator, platform host 210 perform an operation of receiving development application 210. In some embodiments, platform host can request that development application 210 be transmitted and await the transmission. In some embodiments, the transmission is performed asynchronously.

After receiving a transmission that includes development application 210, platform host 230 can then perform processes to integrate the application. In some embodiments, platform host 230 continues a runtime of a current version of the application, which can be an APS runtime, and integrates the application minimizing downtime. For example, in some embodiments, platform host 230 can synchronously apply web components to integrate the application. In some embodiments, platform host 230 can provide a supplementary layer (e.g., framework 240) to a development platform. Framework 240 can include fundamental abstractions of an operating environment, to enable the development platform to be configured as required for development of an application in an isolated of stack form. Framework 240 provides foundational support for application architectures used for application development and testing.

A compiled bundle file (e.g., Application Package 224) can be provided to be dynamically downloaded to a platform host. File downloading to a platform host can thereby be optimized. The bundle file can be prepared as one or more asynchronous web component(s) that can be downloaded incrementally when a new page (i.e., route or representation of application) is rendered by an APS adapter.

At the same time, final bundle file comprises no code of primary vendor-libraries. This code is downloaded into a host from framework 240 directly. In this manner, application deployment can be performed minimizing a bundle file size, where the bundle file comprises specific business layer code only. The IADD system and methodology permits organization of web components for optimal platform host deployment. Web components provide a new layer of isolated applications independent of the platform host.

Accordingly, new applications are configured by IADD systems and methods to exist in parallel with old applications, and the applications do not influence each other. That is, new and old applications coexist with optimal platform host load.

Providing supplementary features in a framework (e.g., adaptive layout framework 220) for local application development enables convenient debugging processes that can include the use of specific real-time means, such as utility tools that help a developer in developing applications (for example, VUE DEVTOOLS).

Due to the independent application creation mode, faster application creation can be achieved due to the absence of the need to send code to the stack every time to check it, so that the set business goals are achieved faster, which was not the case before. Such process organization bring convenience into process, time saving. Additional advantages include deployment of more reliable applications and patches. The same environment is prepared by the framework for runtime and for testing and for local development. At the framework level each potential runtime use case is considered, and development is possible by focusing on a specific business layer. In this manner, a smoother transition from an old workflow to a new workflow can be achieved, permitting incremental development to be performed while minimizing unnecessary downtime.

Integration

Figure 3:
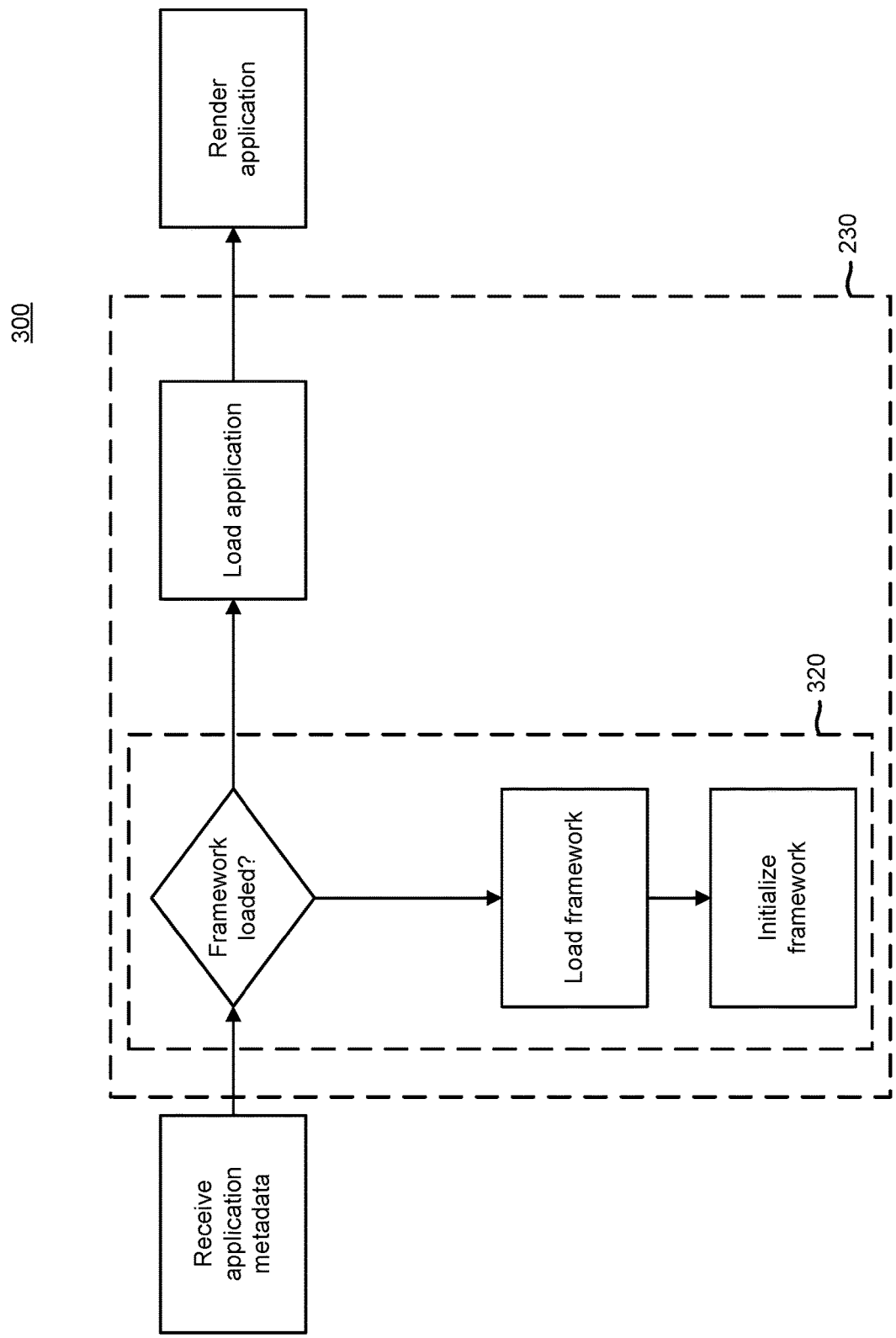
FIG. 3 depicts a methodology for deployment to platform host in an IADD system, according to some embodiments.

FIG. 3 illustrates IADD methodology 300 to deploy a new workload into integrated at an APS runtime. Utilizing a specific description parameter, new applications can be deployed utilizing a framework that comprise means for APS integration. According to embodiments, IADD method 300 enable old and new applications to work in parallel concurrently.

As shown in FIG. 3, at operation 310, platform host 230 can receive application metadata corresponding to an application, such as an APS application. At operation 320, platform host 230 determines whether or not a framework is loaded. Based on the determination, platform host (e.g., at UX framework module 240) can retrieve and initiate a framework as a supplementary layer that can include fundamental abstractions of an operating environment. Therefore, platform host 320 is configured to maintain in runtime supplemental support that includes support for application architectures being developed. These supplementary features enable convenient debugging processes and minimize downtime of production applications, such as an APS runtime.

Figure 4:
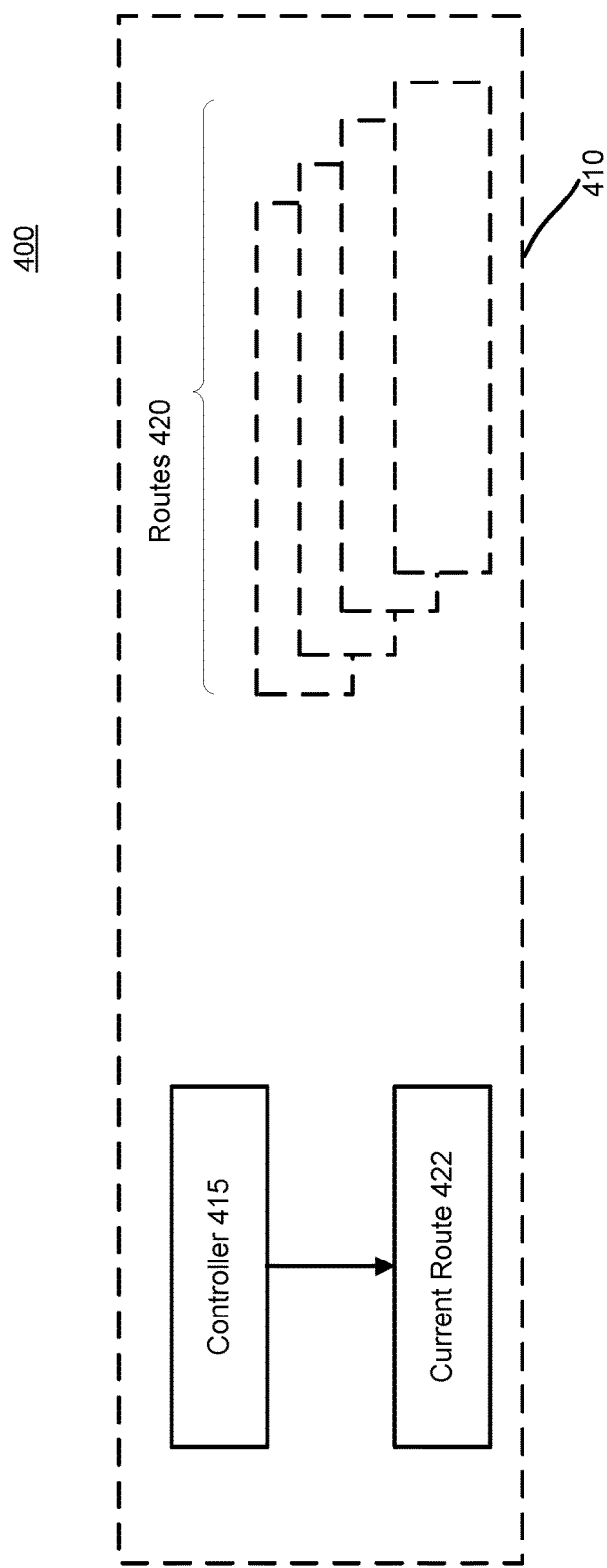
FIG. 4 depicts integration of an application rendered by a platform host in an IADD system, according to some embodiments.

FIG. 4 illustrates IADD system 400 comprising a container as a controller representing the application utilizing a set of web components. As shown in FIG. 4, to rendered application 410 to a client (e.g., client 130), application 410 represents itself as the set of web components, such as routes 420.

System 400 comprises one or more container(s) that function as controller 415 of application 410. Controller 415 acts as an upper layer of one or more web component(s) configured to organize the flow and operation of other web components, i.e., routes 420. Routes 420 are web components that can be provided having an organization implemented by controller 415. Route array 420 comprises one or more routes, providing a library for page navigation (routes) in applications, e.g. web applications. Each route 420 is another view that the web application 410 can render (e.g., current route 422) or hide as requested, for example, by user navigation. Application 410 can include specific representations having an internal physical structure. Therefore, application 410 itself represents web components, i.e., routes 420, that are configured to control other web components.

Figure 5:
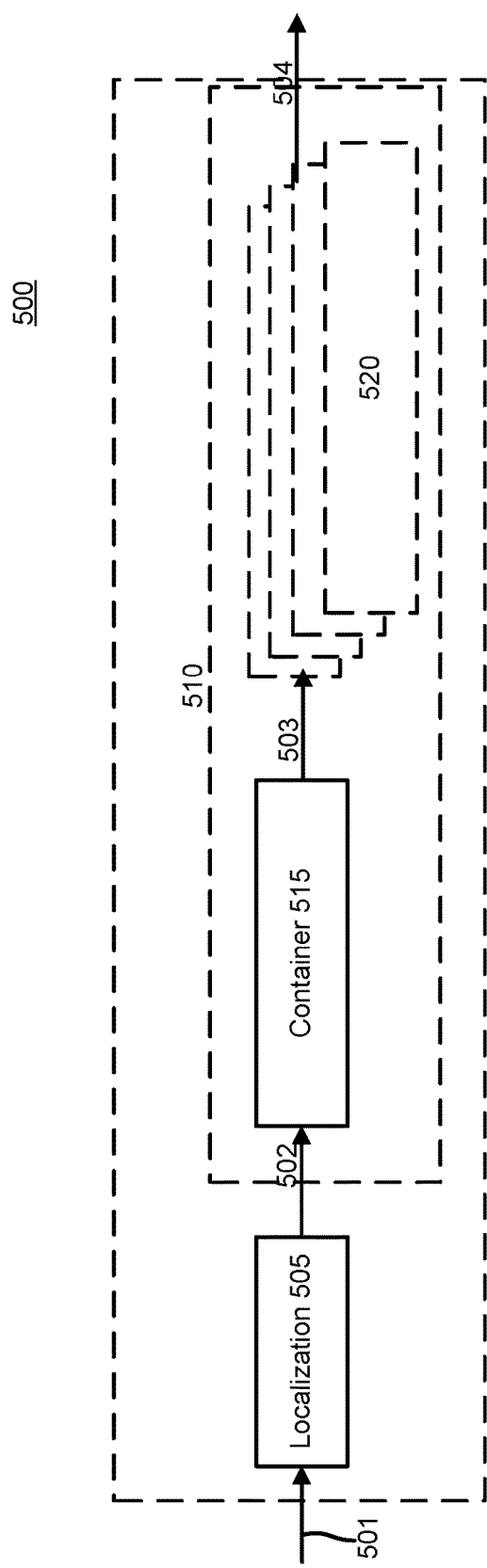
FIG. 5 depicts integration of an application rendered by a platform host in an IADD system, according to some embodiments.

FIG. 5 illustrates a browser application deployment process 500. As shown in FIG. 5, browser application deployment process 500 can include operation 501 in which a localization scheme 505 is initialized to configure a web component.

At operation 502 a web component configured by localization scheme 501 is integrated by controller 510 to a container 515. For example, an initial (i.e., a home) route can be integrated in container 515.

At operation 503 the application deployment can include an operation of splitting a bundle into application bundle chunks 520. Operation 530 can include integration of each chunk 520, which can comprise or correspond to a specific web route component.

At operation 504, upon completion of adding each web component to a browser, initial application life cycle can proceed. Operation 504 can include rendering the configured application for clients (e.g., clients 140).

Platform Host Hand-Shaking

Figure 6:
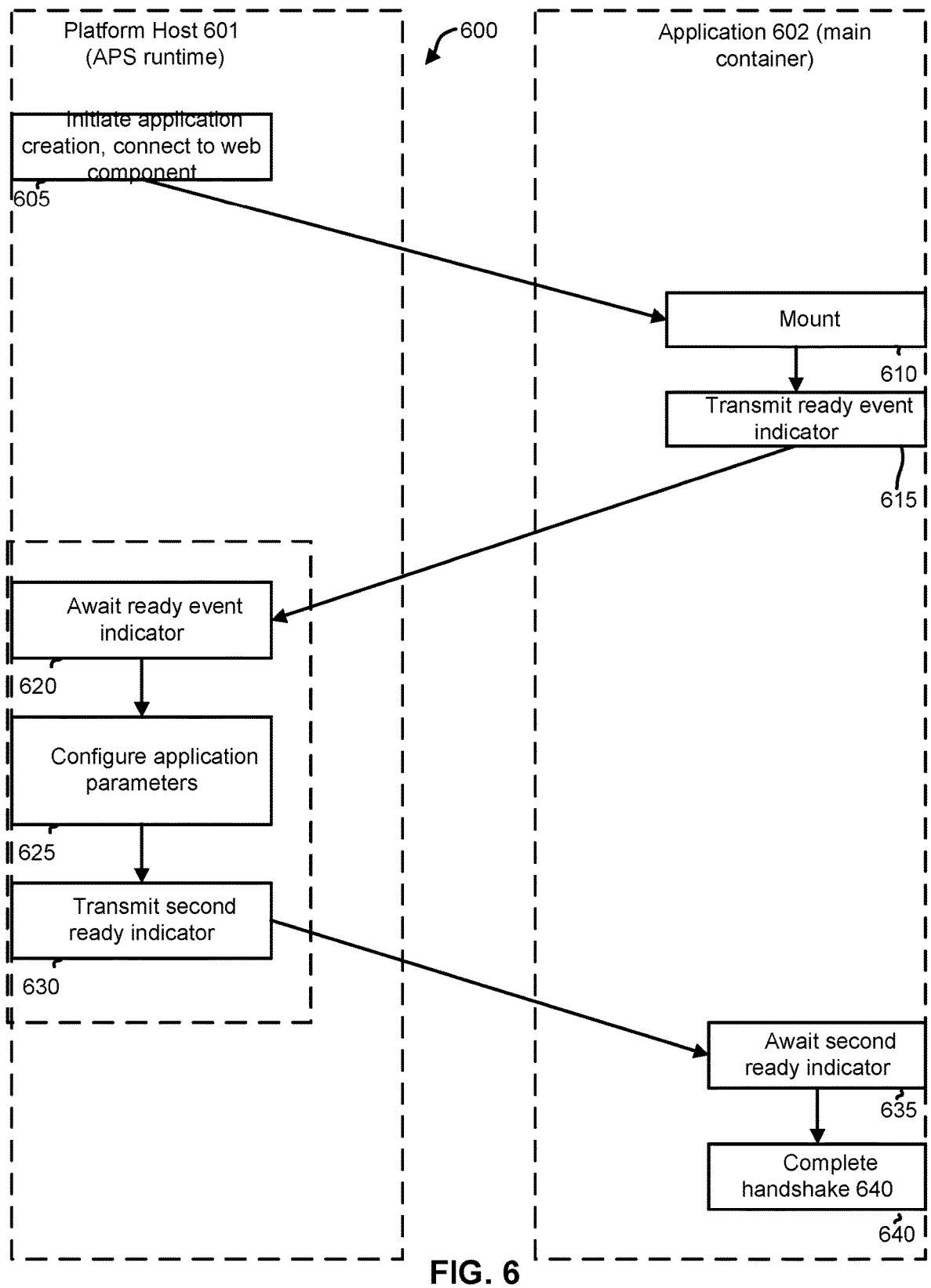
FIG. 6 depicts a handshake methodology between a platform host and an application rendered by a platform host in an IADD system, according to some embodiments.

FIG. 6 illustrates a process 600 for performing a new deployment of an application (which can be, for example, an embodiment of application 102 deployed as application 132, application 210, 410, etc.). Process 600 can include a hand shake between an application provided by a local development platform (e.g., platform 110) and a platform host (e.g., platform host 130) to cause deployment of the application to the runtime. As shown in FIG. 6, after the application is developed, it can be deployed in a platform host.

At operation 605, platform host 601 can perform operations corresponding to web component creation, for example, transmitting a connected web component to an application (e.g., a container such as a main container).

At operation 610, the connected web component is mounted at container 602. Operation 610 can include initiation of a handshake between container 602 and platform host 601.

At operation 615, data including a first indicator, e.g., a flag, can be communicated between container 602 and platform host 601 to indicate that the application is ready for deployment.

At operation 620, platform host 601 awaits communication of the first indicator. Upon receiving the first indicator, platform host 601 can be configured to begin a deployment process, which can be an embodiment of deployment process 500, etc.

At operation 625, upon receiving the first indicator, platform host 601 can be configured to integrate application parameters corresponding, as described above.

At operation 630, after configuring application parameters platform host 601 can communicate data that includes a second indicator to indicate that the application is deployed.

At operation 635, application awaits communication of the second indicator. Upon receiving the second indicator, container 602 sets parameter of the application (e.g., a "public" parameter) at operation 640 to permit rendering of the application by a runtime process. Operation 640 can include, for example, setting a parameter to permit an APS runtime to be rendered by platform host 130 to clients 140.

Event System

According to exemplary embodiments, an event-based methodology of system interactions is provided to enable coordination between a vendor application development platform and a platform host. The event-based methodology of system interactions comprises one or more processes to create an event-controllable specific system, which can be an embodiment of system 100, for example. The event-based methodology of system interactions permits coordination to be achieved without rigid communications between vendor application development platform and a platform host, permitting a vendor application to be changed independently. This event-based methodology provides an advantage over conventional processes that require rigid dependence between a development platform and a platform host, while allowing the local development and host runtime environments to be managed as predictable operations.

According to some embodiments, interaction between a host platform and a vendor application development platform additionally permits coordination of one or more platform framework(s) between a platform host and a development platform. According to exemplary embodiments, these interactions can include (A) vendor application development platform sending events involving one or more framework(s) to a platform host; and (B) the vendor application development platform subscribing to platform host events. In some embodiments, (1) a private event involving one or more framework(s) can be transmitted from an application to a host platform, e.g., an internal use event; (2) a private event can be transmitted from the platform host to the application, e.g., an internal use; (3) a public event involving one or more framework(s) can be transmitted from the application to a platform host, e.g., a public use by a UX1 Framework developer; and (4) a public event can be transmitted from a platform host to a vendor application development platform to, e.g., including an abstraction for providing generic functionality, that can be selectively adapted and implemented by application 102.

This event-based methodology can be configured to perform fundamental systems communications. Such communications can include, for example, information utilized for routing, notification, sending analytics data (such as GOOGLE analytics data), etc. event-based methodology can be configured to perform sharing components involving application features.

The solution made is flexible and can be extended on any number of new features (system communications) with no restriction. The two-way system interaction between the platform host and the application takes place using a proprietary framework system, that can include providing one or more web component(s) configured to organize interaction at a native browser level. According to some embodiments, an IADD event system permits an application in development and a platform host to change independently without requiring a rigid bundle or dependency.

Figure 7:
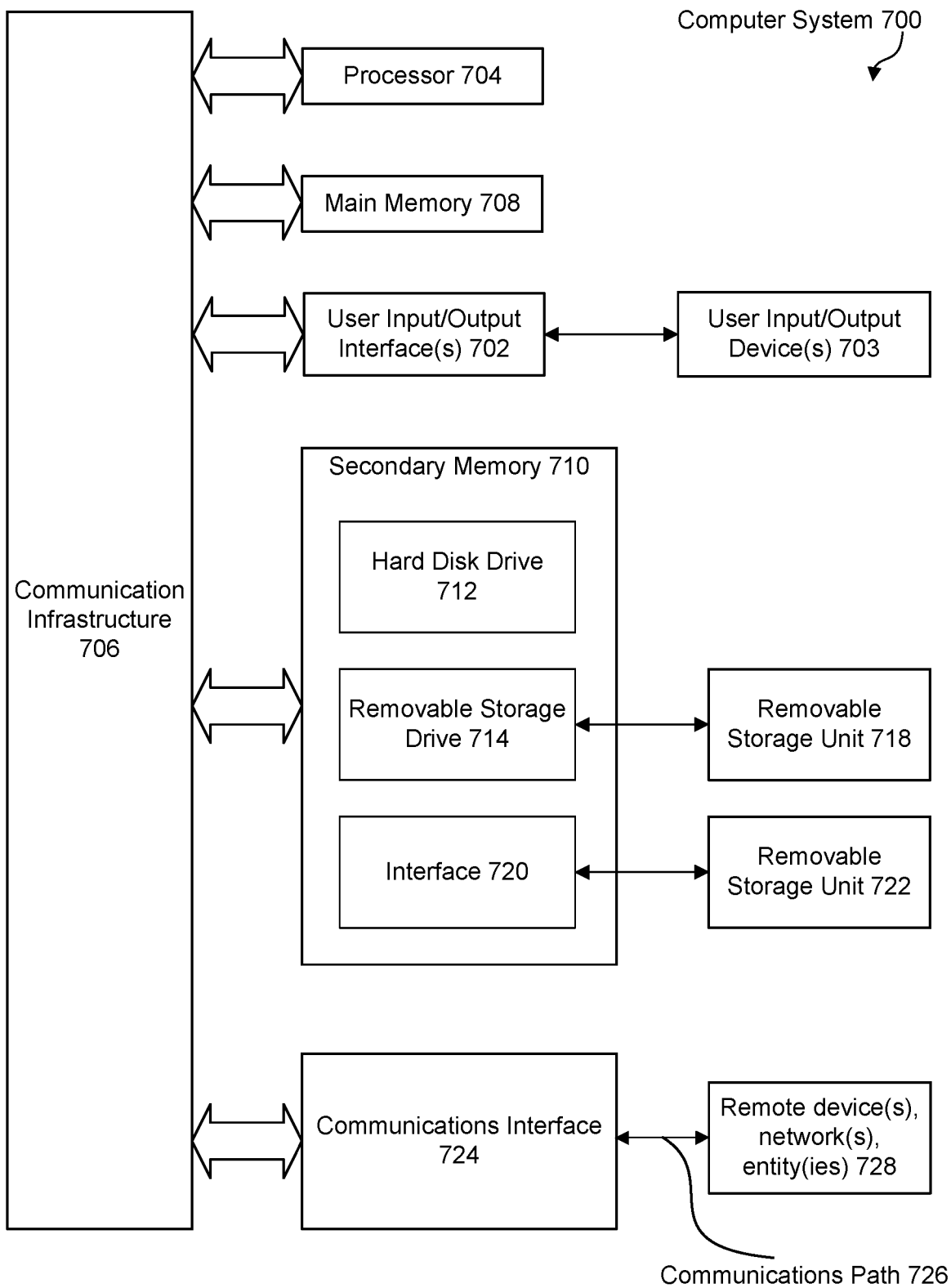
FIG. 7 illustrates an example computing device, according to an example embodiment.

Various embodiments may be implemented, for example, using one or more computer systems, such as computer system 700 shown in FIG. 7. One or more computer systems 700 may be used, for example, to implement any of the embodiments discussed herein, as well as combinations and sub-combinations thereof. For example, computer system 700 can be used to implement system 100 for independent application design and deployment, including framework 104/134 of FIG. 1, method 600 for performing a communication handshake between a platform host and an application, and/or any other implementations of the disclosed embodiments.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It should be understood that the operations shown in the exemplary methods are not exhaustive and that other operations can be performed as well before, after, or between any of the illustrated operations. In some embodiments of the present disclosure, the operations can be performed in a different order and/or vary.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A method for creating, sharing, and integrating a vendor application into a host platform, the method comprising:
    communicating, by a host platform implemented by a host processor, a framework package corresponding to an application framework, wherein the framework package comprises a software abstraction for providing generic functionality in developing a vendor application;
    receiving, by the host platform, an application package corresponding to a vendor application, wherein the application package comprises a plurality of metadata files, control method descriptions, and content files; and
    integrating the application package to generate an integration of the vendor application based on the application framework; and
    initiating a handshake procedure between the vendor application provided by the application package and the host platform, wherein the handshake procedure comprises:
        mounting one or more web components of the vendor application at a container;
        communicating a first indicator between the container and the host platform to indicate that the application is ready for deployment;
        awaiting communication of the first indicator by the host platform;
        upon receiving the first indicator, integrating application parameters corresponding to the vendor application;
        communicating a second indicator to indicate that the application has been deployed; and
        setting parameters of the application to permit rendering by a runtime process.

2. The method of claim 1, wherein the integrating comprises providing one or more updated services from the application package to extend functionality of the integration associated with the application package of a vendor application.

3. The method of claim 1, wherein the integrating comprises applying one or more preset(s) using one or more plugin component(s).

4. The method of claim 1, wherein the integrating comprises generating one or more route(s) as web components having an organization implemented by a controller of the host platform, wherein the host platform is configured to render each of the one or more route(s).

5. The method of claim 1, further comprising: generating an application bundle that implements vendor application in a container, wherein the receiving comprises receiving the application bundle and splitting the application bundle into application one or more bundle chunk(s), each bundle chunk comprising a specific web route component.

6. A system for creating, sharing and integrating applications, comprising: a processing system having one or more processors that execute computer-executable instructions that cause the processing system to:
    communicate, by a host platform, a framework package corresponding to an application framework, wherein the framework package comprises a software abstraction for providing generic functionality in developing a vendor application;
    receive, by the host platform, an application package corresponding to a vendor application, wherein the application package comprises a plurality of metadata files, control method descriptions, and content files; and
    integrate the application package to generate an integration of the vendor application based on the application framework; and
    initiate a handshake procedure between the vendor application provided by the application package and the host platform, wherein the handshake procedure comprises:
        mount one or more web components of the vendor application at a container;
        communicate a first indicator between the container and the host platform to indicate that the application is ready for deployment;
        await communication of the first indicator by the host platform;
        upon receiving the first indicator, integrate application parameters corresponding to the vendor application;
        communicate a second indicator to indicate that the application has been deployed; and
        set parameters of the application to permit rendering by a runtime process.

7. The system of claim 6, wherein the integrating comprises providing one or more updated services from the application package to extend functionality of the integration associated with the application package of a vendor application.

8. The system of claim 6, wherein the integrating comprises applying one or more preset(s) using one or more plugin component(s).

9. The system of claim 6, wherein the integrating comprises generating one or more route(s) as web components having an organization implemented by a controller of the host platform, wherein the host platform is configured to render each of the one or more route(s).

10. The system of claim 6, further comprising: generating an application bundle that implements vendor application in a container, wherein the receiving comprises receiving the application bundle and splitting the application bundle into application one or more bundle chunk(s), each bundle chunk comprising a specific web route component.

11. A non-transitory computer-readable storage medium encoded with instructions that, when executed by a processor, perform operations comprising:
    communicating, by a host platform, a framework package corresponding to an application framework, wherein the framework package comprises a software abstraction for providing generic functionality in developing a vendor application;

receiving, by the host platform, an application package corresponding to a vendor application, wherein the application package comprises a plurality of metadata files, control method descriptions, and content files; and integrating the application package to generate an integration of the vendor application based on the application framework; and initiating a handshake procedure between the vendor application provided by the application package and the host platform, wherein the handshake procedure comprises:

mounting one or more web components of the vendor application at a container;

communicating a first indicator between the container and the host platform to indicate that the application is ready for deployment;

awaiting communication of the first indicator by the host platform;

upon receiving the first indicator, integrating application parameters corresponding to the vendor application;

communicating a second indicator to indicate that the application has been deployed; and setting parameters of the application to permit rendering by a runtime process.

12. The non-transitory computer readable medium of claim 11, wherein the integrating comprises providing one or more updated services from the application package to extend functionality of the integration associated with the application package of a vendor application.

13. The non-transitory computer readable medium of claim 11, wherein the integrating comprises generating one or more route(s) as web components having an organization implemented by a controller of the host platform, wherein the host platform is configured to render each of the one or more route(s).

14. The non-transitory computer readable medium of claim 11, further comprising: generating an application bundle that implements vendor application in a container, wherein the receiving comprises receiving the application bundle and splitting the application bundle into application one or more bundle chunk(s), each bundle chunk comprising a specific web route component.

\* \* \* \* \*